Jan. 24, 1933.  C. H. SUYDAM  1,895,111
SIGNALING SYSTEM
Filed March 30, 1927
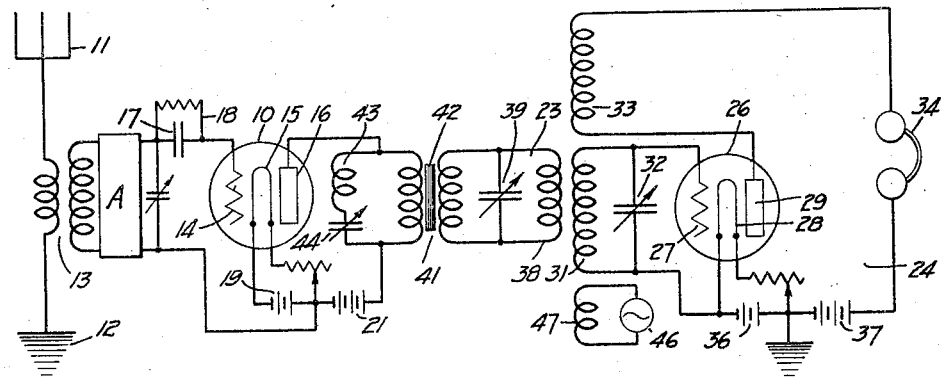
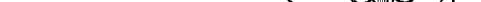
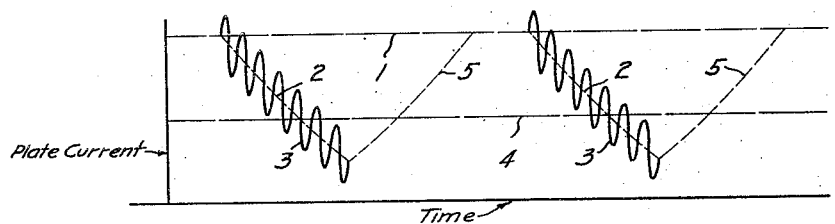
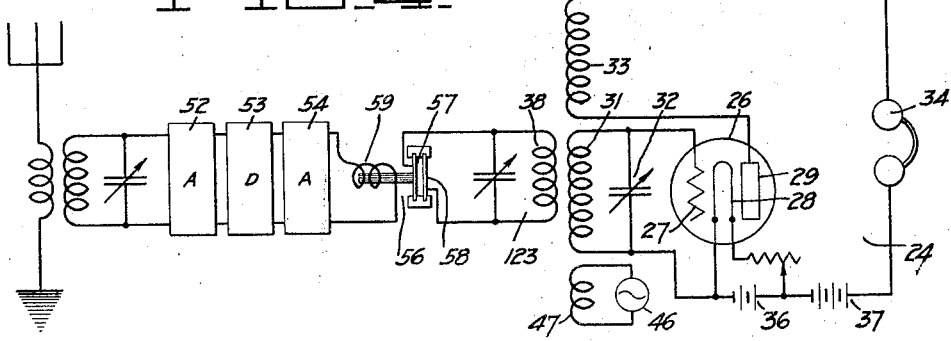
INVENTOR
C. H. Suydam
BY
White, Prost + Fryer
his ATTORNEYS Patented Jan. 24, 1933

1,895,111

UNITED STATES PATENT OFFICE

CLINTON H. SUYDAM, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

SIGNALING SYSTEM

Application filed March 30, 1927. Serial No. 179,445.

This invention relates to systems for detecting carrier waves and is of particular application in the reception of continuous wave radio telegraph signals.

An object of the invention is to reduce the response of the receiving apparatus to extraneous interference such as static without correspondingly reducing the sensitivity of the receiver to signal impulses.

A further object of the invention is the production of a signaling system utilizing the principle of effecting sudden variations in the frequency of an oscillation generator by varying the electrical characteristics of a system of coupled circuits comprising the frequency determining circuits of the generator.

Heretofore devices for giving an audible signal in response to continuous waves of high frequency have been of two general types: The heterodyne in which an audible note is produced by beating the incoming signal wave with a locally generated wave differing in frequency therefrom by an audible amount, and the local modulator type in which the received wave is modulated or chopped at an audible rate at the receiving station. Heterodyne receivers are open to the objection that the received note varies with variation in frequency of the received wave, choppers involve mechanical problems that it is desirable to avoid, and both heterodyne and chopper systems respond excessively to loud crashes of static.

In accordance with this invention the above objectionable features are avoided by causing the received signal to alter the constants of a local oscillatory circuit whereby the frequency of a locally generated wave is changed by an audibly perceptible amount. This system is relatively insensitive to static because a change in the constants of the local oscillatory circuit does not take place instantaneously upon the reception of a strong incoming impulse, but results rather from the cumulative effect of a received wave continuing over a period of time comparable to the length of a telegraphic signal.

A complete understanding of the invention may be obtained from the following description together with the drawing in which, Fig. 1 is a circuit diagram illustrating one form of the invention.

Fig. 2 is a circuit diagram illustrating a modification of the system shown in Fig. 1.

Fig. 3 is a curve illustrating the operation of the system shown in Fig. 1.

Fig. 4 is a circuit diagram illustrating an alternative system to that shown in Fig. 1.

The operation of the system of this invention depends upon a certain phenomenon inherent in the operation of an oscillation generator whose frequency is determined by the electrical characteristics of the circuits to which it is connected. If the frequency determining circuit is resonant at more than one frequency the generator will oscillate at that frequency having the lowest effective resistance.

If two circuits are tuned to substantially the same frequency and possess a mutual impedance or coupling, the circuits will have two resonant frequencies, one above and one below the resonant frequency of each circuit when considered independently. The separation of the frequencies will depend primarily on the coupling between the circuits. When such a system of coupled circuits is incorporated with an oscillation generator, the frequency of which depends upon the period of the oscillatory circuits to which it is connected, the generator frequency may be caused to flip at will from one frequency to the other by varying the electrical characteristics of the coupled circuits. This is accomplished by increasing the effective circuit resistance at the frequency at which the generator is operating until it is in excess of the effective circuit resistance at the second resonant frequency at which it will operate after flipping frequencies.

In the system of this invention I have disclosed means for varying the electrical characteristics of the frequency determining circuit so as to cause the oscillation generator to change frequencies in accordance with signal modulations and means for translating the change in frequency to secure a signal indication.

Referring to that form of the invention which is illustrated in Fig. 1 of the drawing, there is shown a detector 10, preferably of the electron relay type which is coupled to a suitable source of signal energy such as an antenna and ground connection 11 and 12 as by means of a tuned transformer 13. The particular detector shown is of the usual three element type having a grid or control element 14, electron emission element or filament 15 and plate or anode 16. The grid or input circuit includes the grid condenser 17 and grid leak 18. The electron emission element 15 is energized from a suitable source of current such as the usual "A" battery 19, while the output circuit is shown as energized from a "B" battery 21.

Electrically associated with the output of detector 10 there is an oscillatory circuit 23 which will be subsequently referred to as the "control circuit". This control circuit is coupled to a conventional form of oscillation generator 24, and it is this generator which is caused to vary its frequency in accordance with signal modulations. A variety of oscillation generators may be employed although I prefer to make use of a generator of the electron emission or vacuum tube type in which the input and output circuits of a vacuum tube are coupled together. The specific oscillator shown comprises a vacuum tube 26 of the three element type, including a grid 27, filament 28 and plate or anode 29. The grid or input circuit includes an inductance 31 which is tuned as by means of a variable condenser 32. The output circuit includes an inductance 33 which is coupled to inductance 31 to feed back energy into the input of the tube, and also includes a suitable translating device such as a pair of telephone receivers 34. The filament 28 and the output circuit are energized from suitable sources of current such as the "A" and "B" batteries 36 and 37 respectively.

The control circuit 23 is provided with values of capacitance and inductance whereby it may be tuned to a frequency in the neighborhood of the frequency of the oscillator 24. In the particular instance shown it includes an inductance 38 which is inductively coupled with inductance 31. Shunted across inductance 38 there is a tuning device such as a variable condenser 39, and also the secondary of a transformer 41. This transformer is preferably provided with a magnetic core 42, and has its primary included in the output circuit of detector 10. This transformer may be similar to the ordinary iron core radio frequency transformers utilized for coupling together electron relays. Its core should be capable of being saturated with a relatively small current. If desired cores may be used of alloys having a decided saturation point, such as certain nickel-iron alloys. For a reason which will be presently explained the primary of transformer 41 is also preferably shunted by a series resonant circuit including inductance 43 and variable capacitance 44.

In the system as described above if the condenser 39 is adjusted so that the resonance frequency of control circuit 23 does not even approximate the fundamental frequency of oscillation generator 24, the generator will oscillate at its own frequency substantially unaffected by the presence of control circuit 23. However as condenser 39 is adjusted so that the resonance of control circuit 23 approaches that of the oscillation generator, a certain critical point will be reached beyond which the frequency of the oscillation generator will suddenly flip to a slightly different value. In practice the condenser 39 is adjusted near this critical point and the transformer 41 is relied upon to vary the characteristics of the control circuit 23 to cause the frequency of the oscillation generator to flip in accordance with signal modulations. To make this possible it is proposed to saturate the magnetic core 42 of transformer by the normal plate current of detector tube 10. With the core saturated the inductance value across its secondary winding will be relatively low. When a radio signal is received by the detector, the grid 14 becomes more negative by virtue of the grid condenser 17 while the plate current becomes substantially less. This decrease in plate current serves to decrease the magnetism of core 42 below saturation thus causing the inductance across the secondary to be substantially increased. In practice it has been found that this change in the inductance value of the transformer secondary due to a change in the degree of saturation of the core is sufficient to cause the desired flip in the frequency of the oscillation generator. The shunt circuit across the transformer primary is tuned substantially in resonance with the control circuit and serves to make the flip in frequency of the oscillation generator more definite, probably because it provides a low impedance shunt path at the resonance frequency of the control circuit.

In order to translate the frequency variations of the oscillation generator into audible indications, there is provided another local oscillator 46 which is coupled to oscillator 24 as by means of an inductance 47. The frequency of oscillator 46 is adjusted so that when the frequency of generator 24 is varied in response to the reception of signal energy, an audible signal tone is translated by receivers 34, due to beating together of the different frequencies of oscillators 24 and 46. This method of translating the signals is preferable since the slight high frequency variations of oscillation generator 24 are magnified in the beat frequency so that an operator may readily discriminate between the dots and dashes of a telegraphic signal. Either oscillator 46 may be adjusted so that two beat tones are received by means of which the dots and dashes can be distinguished or the frequencies of oscillators 24 and 46 may be made the same for the spaces between the dots and dashes so that a beat tone is received only for the actual signal. This latter mode of operation is to be preferred for operation of visual or mechanical indicating devices.

The curve shown in Fig. 3 serves to illustrate how the system described above minimizes interference and static disturbance. In this curve the vertical axis represents plate current while the horizontal represents time. The horizontal dotted line 1 represents the normal plate current when no signals are being received while curves 2 represent the integrated plate current during the reception of signal energy, as for example during the reception of two telegraphic dots. Curves 3 indicate the radio frequency variations which are integrated in the plate circuit to form curves 2. By proper adjustment of control circuit 23 and of transformer 41 a certain margin of operation may be provided before a signal causes a flip in frequency of oscillator 24. For example the system may be adjusted so that the plate current must be increased to a value represented by horizontal line 4, before the flip in the frequency occurs. In order to decrease the plate current below this critical value a sustained train of oscillations is required upon the detector input circuit in order to build up the requisite negative potential upon grid 14. Between the telegraphic dots and dashes, or between successive trains of oscillations, this negative charge drains off through grid leak 18 as indicated by curves 5. Since static disturbances are generally isolated electrical charges and are not sustained trains of oscillations, they will be comparatively ineffective to build up a negative potential upon the grid sufficient to lower the plate current to the critical value represented by line 4. Furthermore interfering trains of oscillations will have no effect upon the system unless they are of sufficient strength to carry the plate current below this critical value.

In Fig. 2 there is shown a modification of the system described above. In this modification instead of utilizing a transformer 41 which has its core saturated by the normal plate current, the core of the transformer is saturated from an independent source of energy. For example transformer 48, corresponding to transformer 41, is provided with a winding 49 which is continuously energized from a source of current such as the battery 51. By properly adjusting the exciting current, the transformer core may be maintained at saturation during the time when no signals are being received.

In Fig. 4 another modification of the system is shown in which a mechanical device is provided for varying the electrical characteristics of the control circuit. In this case the system has been diagrammatically illustrated as comprising a radio frequency amplifier 52 supplying a suitable detector or integrating device 53. The output of detector 53 may be passed through one or more amplifier stages 54. Connected to the output of the last amplifier stage there is a mechanical device 56 for varying the reactance of the control circuit 123. This mechanical device for example may be in the form of a pair of electrodes 57 and 58 which are placed in capacitative relationship with each other and are mechanically moved together or apart by an electromagnet or solenoid 59 which is supplied from the output of amplifier 54. The operation of this system is practically identical to the system previously described, a signal causing the capacitance between the electrodes 57 and 58 to vary with the result that the frequency of oscillator 24 flips to effect an audible response in receivers 34.

While in the above description of the invention I have made particular reference to inductive coupling between the control circuit 23 and the oscillation generator, it is to be understood that any form of coupling may be employed which will produce the effect of a flip in frequency in response to a change in the electrical characteristics of the control circuit.

In the system described, the frequency of the locally produced wave is changed in response to received signal impulses, but its amplitude is not necessarily changed. It is well known that by changing the impedance, particularly the resistance, of an oscillator circuit the amplitude of the wave produced thereby may be changed, and if the variations of impedance occur at a signal frequency the waves produced by the oscillator will be modulated. Amplitude modulation necessarily implies that waves of new frequencies forming side bands are produced, and in this sense and to this extent ordinary methods of modulations involve frequency changes in the wave modulated. In the following claims where it is stated that the frequency of a locally generated wave is varied in response to received signals it is to be understood that the frequency variation is independent of that incidental to ordinary modulation and is not necessarily accompanied by variations in amplitude.

I claim:

1. In a signal receiving system a local oscillator, an oscillation circuit electrically coupled to said oscillator, said oscillator being characterized in that it changes its frequency suddenly to a new value following a predetermined change in the constants of said oscillation circuit beyond a critical limit, means responsive to signal energy modulations for varying the electrical characteristics of said oscillation circuit beyond said critical limit past which the oscillator frequency flips to a different value, and means for translating said frequency variations to secure a signal indication.

2. In a signal receiving system, a local oscillator, an oscillation circuit electrically coupled to the oscillator, said oscillator being characterized in that it changes its frequency suddenly to a new value following a predetermined change in the constants of said oscillation circuit beyond a critical limit, means for varying the electrical characteristics of said oscillation circuit in accordance with signal modulations, said variations being beyond the critical limit past which the oscillator flips to a different frequency, and means for translating said frequency variations to secure a signal indication, said means including means for beating the oscillator current with another oscillatory current of substantially constant frequency.

3. In a signal receiving system, the combination of a detector, a source of constant frequency current, a generator of oscillations comprising a vacuum tube having coupled input and output circuits, one of which is tunable to determine the frequency normally generated, a third circuit tunable to said frequency and so coupled to said oscillation generator circuits as to cause said coupled circuits to have two degrees of freedom, one of which corresponds to the frequency normally generated, means controlled by said detector for causing such a predetermined change in effective resistance of said coupled circuits, that said generator is caused to oscillate at another frequency predetermined by the other degree of freedom, and means to cause the constant frequency current to beat with that of the oscillation generator to produce signals.

4. In a signal receiving system, the combination of a detector, a source of constant frequency current, a generator of oscillations comprising a vacuum tube having coupled input and output circuits, one of which is tunable to determine the frequency normally generated, a third circuit tunable to said frequency and so coupled to said oscillation generator circuits as to cause said coupled circuits to have two degrees of freedom, one of which corresponds to the frequency normally generated, means controlled by said detector for causing such a predetermined change in at least one of the electrical constants of said coupled circuits, that said generator is caused to oscillate at another frequency predetermined by the other degree of freedom, and means to cause the constant frequency current to beat with that of the oscillation generator to produce signals.

5. In a signal receiving system, the combination of a detector, a source of constant frequency current, a generator of oscillations comprising a vacuum tube having coupled input and output circuits, one of which is tunable to determine the frequency normally generated, a third circuit tunable to said frequency and so coupled to said oscillation generator circuits as to cause said coupled circuits to have two degrees of freedom, one of which corresponds to the frequency normally generated, means controlled by said detector for causing such a predetermined capacitance change in one of said coupled circuits, that said generator is caused to oscillate at another frequency predetermined by the other degree of freedom, and means to cause the constant frequency current to beat with that of the oscillation generator to produce signals.

6. In combination, a generator of oscillations comprising a vacuum tube having coupled input and output circuits, one of which is tunable to determine the frequency normally generated, a third circuit tunable to said frequency and so coupled to said oscillation generator circuits as to cause said coupled circuits to have two degrees of freedom, one of which corresponds to the frequency normally generated, and means for causing such a predetermined change in effective resistance of said coupled circuits that said generator is caused to produce oscillations at another frequency determined by the other degree of freedom.

In testimony whereof, I have hereunto set my hand.

CLINTON H. SUYDAM.